United States Patent
Birecki (10) Patent No.: US 7,206,483 B1
(45) Date of Patent: Apr. 17, 2007

(54) METHOD OF FORMING A PLURALITY OF OPTICAL WAVEGUIDE BUNDLES

(75) Inventor: Henryk Birecki, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/264,310

(22) Filed: Nov. 1, 2005

(51) Int. Cl.
    *G02B 6/06* (2006.01)

(52) U.S. Cl. .................. 385/116; 385/120; 385/121; 156/250; 156/296

(58) Field of Classification Search ........ 385/116–121; 156/296, 291, 250, 441, 178, 179; 362/554, 362/556
See application file for complete search history.

(56) References Cited

U.S. PATENT DOCUMENTS

| | | | |
|---|---|---|---|
| 3,644,922 A * | 2/1972 | James et al. .................. 345/32 |
| 3,819,442 A * | 6/1974 | Brushenko .................. 156/180 |
| 4,289,558 A * | 9/1981 | Eichenbaum et al. ....... 156/179 |
| 4,323,951 A | 4/1982 | Pasco | |
| 4,349,815 A | 9/1982 | Spooner | |
| 5,053,765 A * | 10/1991 | Sonehara et al. ...... 340/815.43 |
| 5,120,387 A * | 6/1992 | De Bie .................. 156/250 |
| 5,376,201 A * | 12/1994 | Kingstone .................. 156/174 |
| 6,100,869 A | 8/2000 | Angermuller et al. | |
| 6,761,459 B1 | 7/2004 | Arsenich | |
| 2005/0093814 A1 | 5/2005 | Kuo et al. | |

* cited by examiner

*Primary Examiner*—Hemang Sanghavi (57) ABSTRACT

A method of forming a plurality of optical waveguide bundles may include arranging a plurality of optical waveguides in a substantially coplanar configuration, constraining a distal portion of the plurality of optical waveguides with an initial distal constraint, and pulling the constrained plurality of optical waveguides to a subsequent length. The subsequent length comprises a first bundle length and a second bundle length. The method also includes clustering a middle portion of the plurality of optical waveguides, wherein the middle portion retains the substantially coplanar configuration, constraining the middle portion with a middle constraint, and constraining a proximal portion of the plurality of optical waveguides with a proximal constraint. The method further includes pulling the constrained plurality of optical waveguides, separating the constrained plurality of optical waveguides at approximately the middle portion of the middle constraint, and splitting the proximal constraint to form a first optical waveguide bundle and a second optical waveguide bundle, wherein approximately a first half of the proximal constraint forms a subsequent distal constraint for a subsequent plurality of optical waveguides.

26 Claims, 5 Drawing Sheets

FIG. 5

METHOD OF FORMING A PLURALITY OF OPTICAL WAVEGUIDE BUNDLES

BACKGROUND

Many electronic devices include or use display devices for visually communicating information to a user. Typically, these display devices are mass produced and the manufacture and development of such display devices can be an expensive process. For example, conventional rear projection display devices typically require an assembly of lenses operating in connection with a series of reflective surfaces, such as mirrors, to direct light to a screen in the display device. The manufacture and assembly of these parts can be complex and expensive, and reducing costs of display devices incorporated in products, such as laptops and televisions, may substantially reduce product costs allowing a manufacturer to be more competitive in the market place.

SUMMARY

An embodiment of a method of forming a plurality of optical waveguide bundles includes arranging a plurality of optical waveguides in a substantially coplanar configuration, constraining a distal portion of the plurality of optical waveguides with an initial distal constraint, and pulling the constrained plurality of optical waveguides to a subsequent length. The subsequent length comprises a first bundle length and a second bundle length. The method also includes clustering a middle portion of the plurality of optical waveguides, wherein the middle portion retains the substantially coplanar configuration, constraining the middle portion with a middle constraint, and constraining a proximal portion of the plurality of optical waveguides with a proximal constraint. The method also includes pulling the constrained plurality of optical waveguides, separating the constrained plurality of optical waveguides at approximately the middle portion of the middle constraint, and splitting the proximal constraint to form a first optical waveguide bundle and a second optical waveguide bundle, wherein approximately a first half of the proximal constraint forms a subsequent distal constraint for a subsequent plurality of optical waveguides.

BRIEF DESCRIPTION OF THE DRAWINGS

Embodiments are illustrated by way of example and not limitation in the accompanying figures in which like numeral references refer to like elements, and wherein.

DETAILED DESCRIPTION

For simplicity and illustrative purposes, the principles of the embodiments are described. However, one of ordinary skill in the art would really recognize that the same principles are equally applicable to, and can be implemented with variations that do not depart from the true spirit and scope of the embodiments. Moreover, in the following detailed description, references are made to the accompanying figures, which illustrate specific embodiments.

Figure 1:
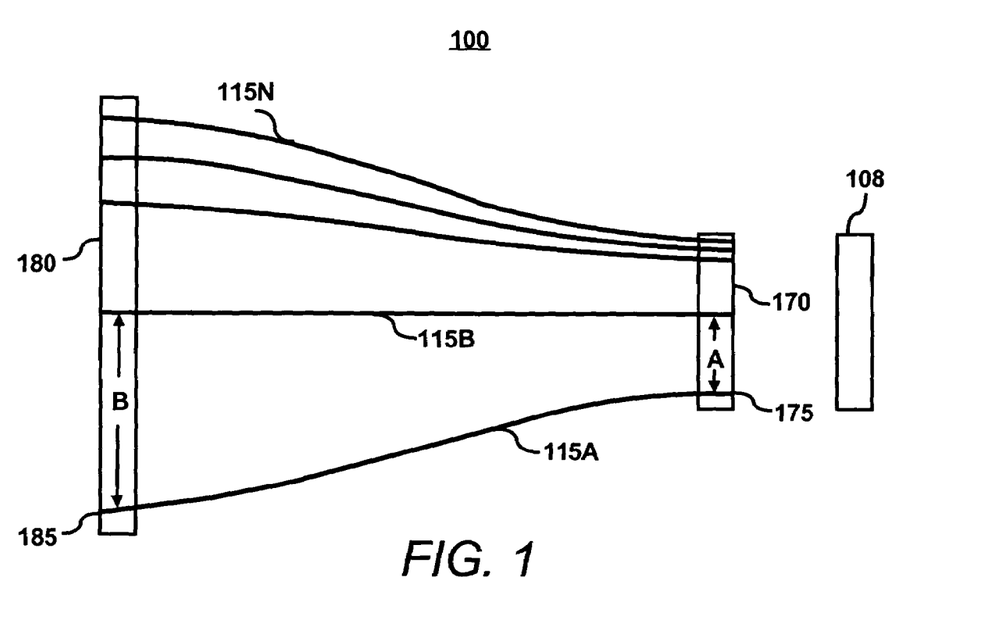
FIG. 1 shows an optical waveguide bundle, according to an embodiment.

FIG. 1 illustrates an optical waveguide bundle 100, according to an embodiment. Multiple optical waveguide bundles, including the optical waveguide bundle 100, may be used to form a display device, as described in detail below.

The optical waveguide bundle 100 may include a plurality of individual optical waveguides 115A, 115B . . . 115N. Each of the optical waveguides 115A, 115B . . . 115N has an input side 175 and an output side 185. In addition, as described in detail below, the input side 175 and the output side 185 of each of the optical waveguides 115A, 115B . . . 115N may be constrained using an input-side constraint 170 and an output-side constraint 180, respectively, to form the optical waveguide bundle 100.

Each of the optical waveguides 115A, 115B . . . 115N may be formed as a fiber optic guide, wherein light may be guided from a light source 108 through an interior of the fiber optic guide. Each of the optical waveguides 115A, 115B . . . 115N may also be fabricated as a light guide, bristle waveguide, light pipe, or other suitable structure operable to carry light. Each of the optical waveguides 115A, 115B . . . 115N may be formed from a fiber optic material, thus allowing the light to be transmitted through the optical waveguides 115A, 115B . . . 115N. In addition, each of the optical waveguides 115A, 115B . . . 115N may be fabricated to have a suitable length, width or other dimension as needed or desired. Thus, the optical waveguide bundle 100 may also be fabricated to have a suitable length, width or other dimension as needed or desired.

The optical waveguide bundle 100 may receive light from the light source 108. The light source 108 may include a power source (not shown), such as battery, or may alternatively include a rechargable power source which derives power from connection to a charger. The light source 108 may also include a meter, such as a potentiometer (not shown), for adjusting the light intensity as desired or needed. For instance, the light source 108 may produce light of a suitable intensity and wavelength for use in transmitting the light through the optical waveguides 115A, 115B . . . 115N that form the optical waveguide bundle 100 to generate an image using a display device, such as a rear projection display device. One example of a display device that includes an assembly of light guides is shown in FIG. 2B and described in U.S. patent application Ser. No. 10/698,829 to Kuo et al., entitled "Light guide apparatus for use in rear projection display environments," which is incorporated by reference herein in its entirety, and which is assigned to the same assignee as the present application.

The input side 175 and the output side 185 of each of the plurality of the optical waveguides 115A, 115B . . . 115N may be constrained using the input-side constraint 170 and the output-side constraint 180, respectively, to form the optical waveguide bundle 100. The input-side constraint 170 and the output-side constraint 180 may each be formed using an epoxy or other suitable material for constraining the input side 175 and the output side 185 of each of the plurality of the optical waveguides 115A, 115B . . . 115N in a fixed or substantially fixed position. For instance, an ultraviolet (UV) curable epoxy may be used to constrain each input side 175 and each output side 185 of each of the plurality of the optical waveguides 115A, 115B . . . 115N, respectively, to form the optical waveguide bundle 100.

Referring to FIG. 1, the distance A that separates each input side 175 of each corresponding optical waveguide 115A, 115B . . . 115N, and the distance B that separates each output side 185 of each corresponding optical waveguide 115A, 115B . . . 115N may vary as needed or desired, to achieve a desired configuration and density of optical waveguides. For instance, although a limited number of optical waveguides 115A, 115B . . . 115N are shown in FIG. 1, any number of optical waveguides 115 may be used to fabricate the optical waveguide bundle 100 based on a variety of factors, such as the number of pixels in the display and the size of the pixels. In addition, although each of the non-constrained portions of the plurality of optical waveguides 115A, 115B . . . 115N are shown as non-overlapping in the space occupied between the input-side constraint 170 and the output-side constraint 180, as shown in FIG. 1, the plurality of optical waveguides 115A, 115B . . . 115N may also be arranged such that the non-constrained portions overlap or have excess length between the input-side constraint 170 and the output-side constraint 180.

Figure 2A:
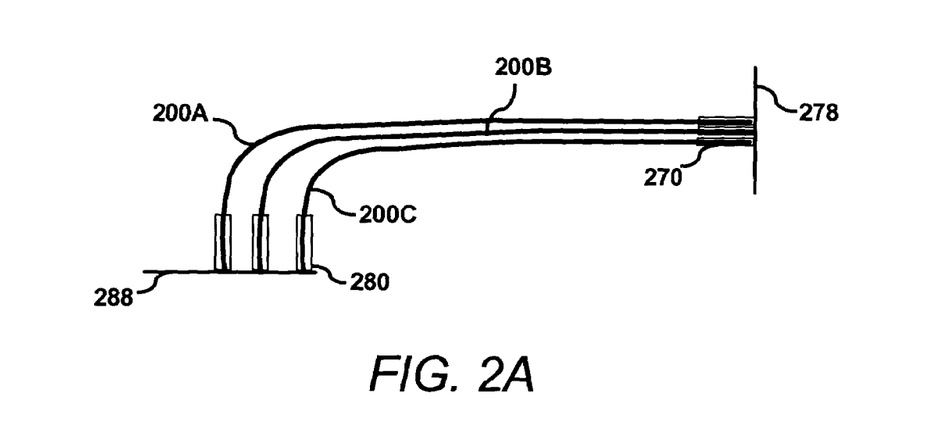
FIG. 2A shows a plurality of optical waveguide bundles, according to an embodiment.
Figure 2B:
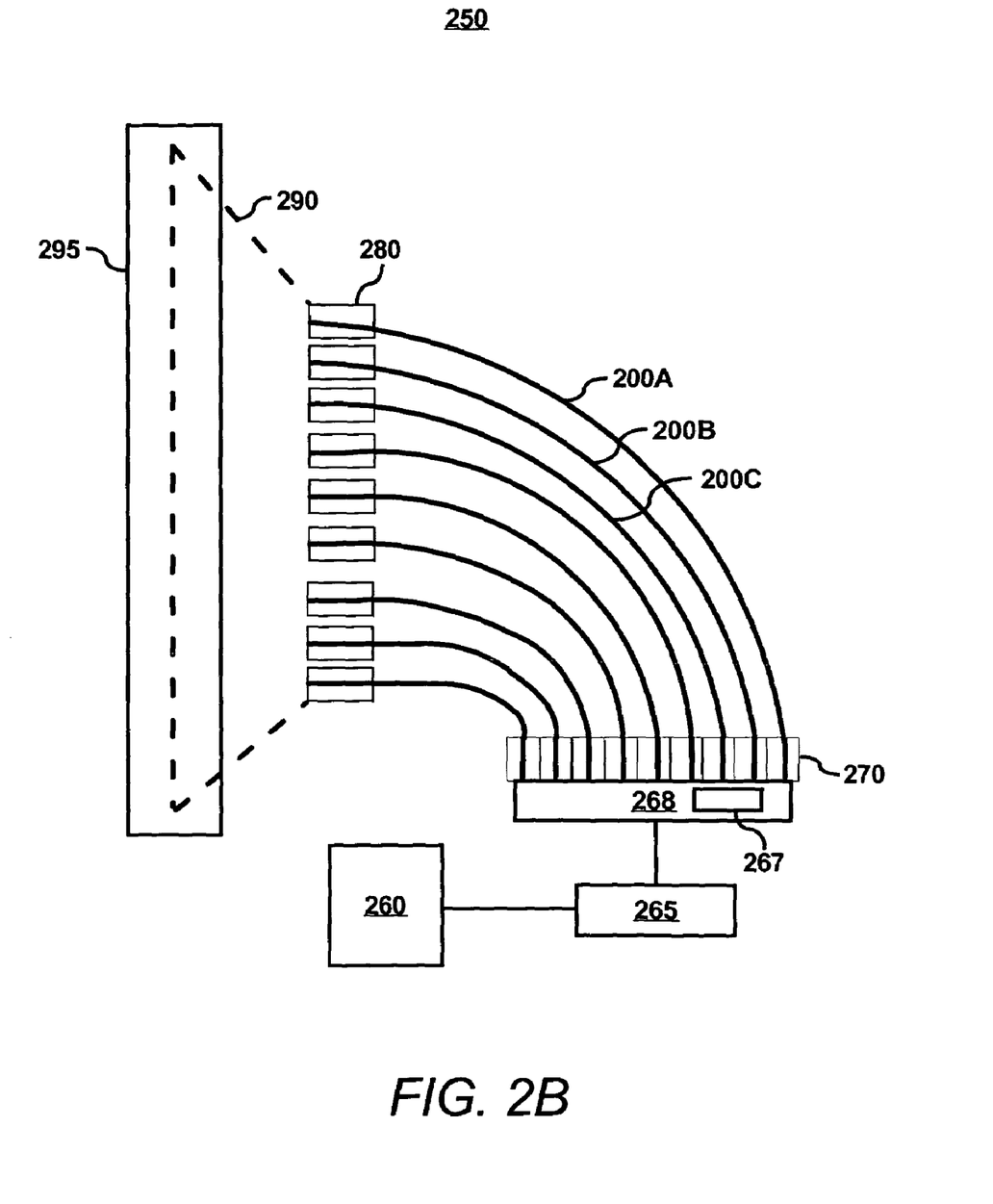
FIG. 2B shows a display device with a plurality of optical waveguide bundles, according to an embodiment.

Referring to FIG. 2A, a plurality of optical waveguide bundles 200A, 200B and 200C are shown, according to an embodiment. Each of the optical waveguide bundles 200A, 200B and 200C may be fabricated to have the characteristics of the optical waveguide bundle 100, as shown and described above, with reference to FIG. 1. Each of the optical waveguide bundles 200A, 200B and 200C may have a corresponding input-side constraint 270 and an output-side constraint 280. The input-side constraint 270 and the output-side constraint 280 are examples of the input-side constraint 170 and the output-side constraint 180, respectively, as shown and described above with reference to FIG. 1.

As shown in FIG. 2A, the plurality of optical waveguide bundles 200A, 200B and 200C may be arranged such that the plurality of optical waveguide ends constrained by the corresponding input-side constraints 270 form an input-side optical waveguide face plate 278 of a display device. The input-side optical waveguide face plate 278 may be substantially polished to receive a projected image from a source, such as the source 108 shown in FIG. 1 or the source 260 shown in FIG. 2B. In addition, the plurality of optical waveguide ends constrained by the corresponding output-side constraints 280 may be arranged to form an output-side optical waveguide face plate 288 of the display device. The output-side optical waveguide face plate 288 may also be substantially polished. In addition, the output-side optical waveguide face plate 288 may also be covered partially, substantially or entirely with a suitable light scattering material. A suitable light scattering material may operate to increase a viewing angle for a user, and may also enhance other characteristics, such as a reduced grainlike appearance, of an image projected from the display device.

The optical waveguide face plate 278 and 288 may be arranged in a substantially orthogonal configuration, or arranged in another suitable configuration as needed or desired, to form the display device. Although a limited number of the optical waveguide bundles 200A, 200B and 200C are shown, any suitable number of optical waveguide bundles may be arranged to change the density of optical waveguide bundles used to form the display device. In addition, other suitable materials or structures, such as microlenses (not shown), may be formed overlying the output-side optical waveguide face plate 288 to provide dispersion of outgoing light. The thickness of the output-side optical waveguide face plate 288 may also be varied as needed or desired. The dimensions of the output-side of each optical waveguide forming the output-side optical waveguide face plate 288 may also correspond approximately to the dimensions of a single pixel.

The plurality of optical waveguide bundles 200A, 200B and 200C may be arranged to achieve a desired degree of magnification between the input-side optical waveguide face plate 278 and the output-side optical waveguide face plate 288. In one example, a display device may be formed by arranging each of the input-side constraints 270 and the corresponding output-side constraints 280 to achieve a magnification of greater than one between each of the input-side constraints 270 and the corresponding output-side constraints 280. In another example, each of the input-side constraints 270 and the corresponding output-side constraints 280 may be arranged to achieve a magnification of at least ten between each of the input-side constraints 270 and the corresponding output-side constraints 280. An image may be collected be the optical waveguide ends of each of the plurality of optical waveguide bundles 200A, 200B and 200C forming the input-side optical waveguide face plate 278. The image may be magnified when projected by the optical waveguide ends forming the output-side optical waveguide face plate 288. The spacing between each of the corresponding output-side constraints 280 may be adjusted as needed or desired to modify the degree of image magnification that is output from the output-side optical waveguide face plate 288.

A suitable apparatus (not shown) may be used to form a display device that includes the input-side optical waveguide face plate 278 and the output-side optical waveguide face plate 288. For instance, a robotic device or other mechanical or electromechanical device may be used to form the display device that includes arranging the input-side optical waveguide face plate 278 and the output-side optical waveguide face plate 288 in a substantially orthogonal configuration.

Referring to FIG. 2B, a rear projection display device 250 projects an image onto a screen 295, such as a flat panel display screen. The display device 250 includes a source 260, which may provide analog or digital signals in the form of bits, individual pixels, entire images, or other applicable input forms. The source 260 is an example of the source 108 shown in FIG. 1. The input form may be converted to an overall image by a converter 265, which may receive digital signals and convert the digital signals to analog signals, or receive television signals, for instance, and convert the signals to an image or images. The converter 265 may thus receive input signals in a particular format and convert the received input signals into an image or series of images. The display device 250 also includes a receiver/transmitter 268 which receives one or more converted images from the converter 265 and transmits the converted images to a plurality of optical waveguide bundles, including the optical waveguide bundles 200A, 200B and 200C, for projecting the image or images 290 onto the screen 295. The screen 295 may include a flat panel screen or other suitable screen for communicating visual information. The display device 250 may also include a light source 267 for changing the intensity or other optical features, such as enhancing the brightness, of the projected image or images 290.

The plurality of optical waveguide bundles, including the optical waveguide bundles 200A, 200B and 200C, thus operate for projecting one or more images 290 onto the screen 295. Although a limited number of optical waveguide bundles, including the optical waveguide bundles 200A, 200B and 200C, are shown, any suitable number of optical waveguide bundles may be used to project an image or images 290 onto the screen 295. Each of the optical waveguide bundles, as shown in FIG. 2B, may have a generally curved configuration between each corresponding input-side constraint 270 and output-side constraint 280. One example of another light guide assembly having a generally curved configuration is shown and described in U.S. patent application Ser. No. 10/698,829 to Kuo et al., entitled "Light guide apparatus for use in rear projection display environments," previously incorporated by reference.

The plurality of optical waveguide bundles, including the optical waveguide bundles 200A, 200B and 200C, may also be arranged to achieve a desired degree of magnification of the image 290 onto the screen 295. In addition, the spacing between each of the corresponding output-side constraints 280 may be adjusted as needed or desired to modify the degree of image magnification that is output from the output-side optical waveguides. Moreover, the dimensions of the output-side of each optical waveguide within the optical waveguide bundles 200A, 200B and 200C may correspond approximately to the dimensions of a single pixel. Although not shown in FIG. 2B, the display device 250 may also include an input-side optical waveguide face plate 278 and an output-side optical waveguide face plate 288, as shown and described above with reference to FIG. 2A, for projecting an image onto the screen 295.

Figure 3A:
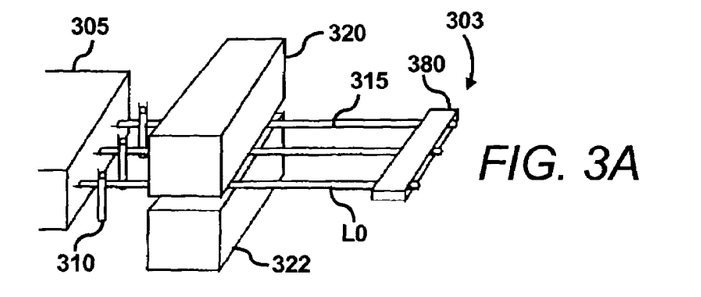
FIG. 3A shows a first stage in the formation of at least two optical waveguide bundles, according to an embodiment.

Referring to FIG. 3A, a first stage is shown in the formation of at least two optical waveguide bundles, according to an embodiment. During an initialization process, an initial length L0 of a plurality of optical waveguides 315 may be supplied from a source 305. Although the length L0 is shown as having a particular length in FIG. 3A, the length L0 may vary as needed or desired. Upon supplying the initial length L0 of the plurality of optical waveguides 315, the distal portion 303 of the initial length L0 is not constrained. As described in detail below, an output-side constraint 380 is formed for constraining the distal portion 303 of the initial length L0.

The source 305 may include a source that operates in either a manual or an automatic mode for supplying the initial length L0 of the plurality of optical waveguides 315. The initial length L0 of the plurality of optical waveguides 315 may also be guided by at least one guide mechanism, including a plurality of output periodically defining pins 310 for guiding the plurality of optical waveguides 315.

Referring to FIG. 3A, a first set of clamps 320 and 322 may be used to clamp the initial length L0 of the plurality of optical waveguides 315, such that the plurality of optical waveguides 315 retains a substantially coplanar configuration. The plurality of optical waveguides 315 may be arranged in a substantially coplanar configuration such that at least an intervening space separates each of the plurality of optical waveguides 315. In addition, a distal portion 303 of the plurality of optical waveguides 315 at length L0 is constrained with the output-side constraint 380.

The output-side constraint 380 may surround each of the ends of the plurality of optical waveguides 315 at the distal portion 303. Forming the output-side constraint 380 may include application of a curable epoxy, such as a UV curable epoxy, such that the curable epoxy surrounds each of the distal ends of each of the plurality of optical waveguides 315.

Figure 3B:
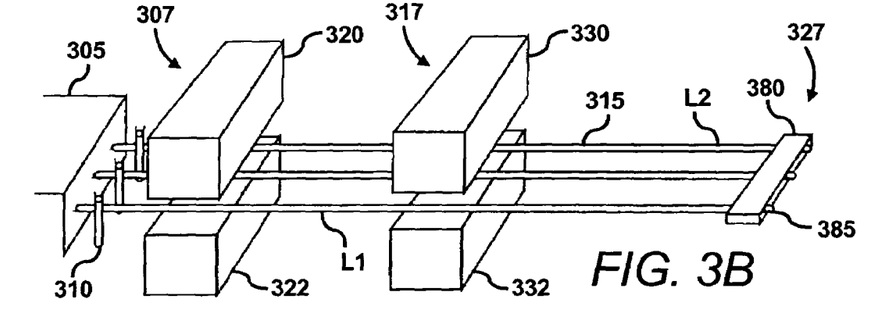
FIG. 3B shows a stage subsequent to that shown in FIG. 3A in the formation of at least two optical waveguide bundles, according to an embodiment.

Referring to FIG. 3B, a stage subsequent to that shown in FIG. 3A is shown in the formation of at least two optical waveguide bundles. After the output-side constraint 380 is formed at the distal portion 303 of the plurality of optical waveguides 315 at length L0, the constrained plurality of optical waveguides 315 is pulled to a subsequent length, wherein the subsequent length includes a length of approximately a first bundle length L1 and a second bundle length L2. After pulling to the subsequent length of approximately L1 plus L2, the distal portion 327 which is constrained with the output-side constraint 380 may be substantially fixed in position. The output-side constraint 380 constrains each distal end 385 of the plurality of optical waveguides 315. The constrained distal portion 327 of the plurality of optical waveguides 315 is used in forming the output-side optical waveguide face plate 288, as described in detail above with reference to FIG. 2A.

The plurality of optical waveguides 315 may be fixed at the subsequent length, wherein the subsequent length includes approximately the first bundle length L1 and the second bundle length L2. The second bundle length L2 may be approximately equal to the first bundle length L1.

A second set of clamps 330 and 332 may be used to clamp approximately a middle portion 317 of the plurality of optical waveguides 315, wherein the middle portion 317 is located at approximately a midpoint location between the first bundle length L1 and the second bundle length L2. After clamping the plurality of optical waveguides 315 with the second set of clamps 330 and 332, the middle portion 317 of the plurality of optical waveguides 315 may be substantially free to move within the substantially coplanar configuration. For instance, the middle portion 317 of the plurality of optical waveguides 315 may be substantially free to move within a lateral direction to retain the substantially coplanar configuration. The first set of clamps 320 and 322 may continue to be provided such that the first bundle length L1 of the plurality of optical waveguides 315 also retains the substantially coplanar configuration.

Figure 3C:
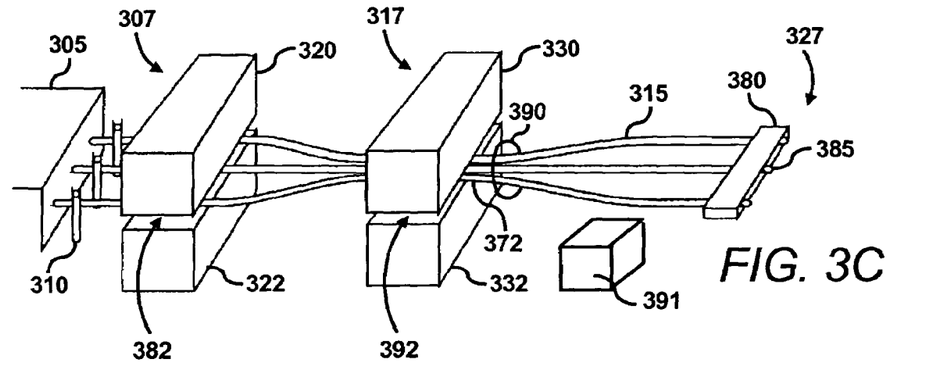
FIG. 3C shows a stage subsequent to that shown in FIG. 3B in the formation of at least two optical waveguide bundles, according to an embodiment.

Referring to FIG. 3C, a stage subsequent to that shown in FIG. 3B is shown in the formation of the at least two optical waveguide bundles. As shown in FIG. 3C, an approximate middle portion 317 of the plurality of optical waveguides 315 may be clustered by a clustering device 390 to form a cluster 372 of the plurality of optical waveguides 315, such that the approximate middle portion 317 retains the substantially coplanar configuration. The approximate middle portion 317 may be located at a distance that is approximately at a midpoint between the first bundle length L1 and the second bundle length L2. Clustering the approximate middle portion 317 of the plurality of optical waveguides 315 may also involve clustering the approximate middle portion 317 using a pin (not shown) or other clustering material with the clustering device 390.

After clustering the approximate middle portion 317 of the plurality of optical waveguides 315, the approximate middle portion 317 of the plurality of optical waveguides 315 may be immobilized or substantially immobilized with the second set of clamps 330 and 332. In addition, a proximal portion 307 of the plurality of optical waveguides 315 may be immobilized or substantially immobilized with the first set of clamps 320 and 322. The proximal portion 307 of the plurality of optical waveguides 315 may be located near the source 305 and the plurality of periodicity defining pins 310. Alternatively, the proximal portion 307 of the plurality of optical waveguides 315 may be immobilized or substantially immobilized with a third set of clamps (not shown) that are identical in structure to the first set of clamps 320 and 322.

After immobilizing or substantially immobilizing the approximate middle portion 317 and the proximal portion 307 of the plurality of optical waveguides 315, a middle constraint 392 and a proximal constraint 382 may be placed on the approximate middle portion 317 and the proximal portion 307, respectively, of the plurality of optical waveguides 315. Alternatively, after the approximate middle portion 317 is constrained with the middle constraint 392, the plurality of optical waveguides 315 may be further pulled to an additional length (not shown) to adjust the length of L1 before applying the proximal constraint 382 to the proximal portion 307. The middle constraint 392 and the proximal constraint 382 are hidden from the view shown in FIG. 3C, but the middle constraint 392 and the proximal constraint 382 are located between the clamps 320 and 322 respectively. The constraints 382 and 392 may be similar to the constraint 380.

The proximal constraint 382 and the middle constraint 392 may each be formed using an epoxy, such as a UV curable epoxy, in a manner similar to that used for forming the output-side constraint 380, as described above. Constraining the immobilized middle portion 317 may involve application of one or more additional types of curable epoxy to the immobilized middle portion 317. In addition, constraining the immobilized proximal portion 307 may also involve application of one or more additional types of curable epoxy to the immobilized proximal portion 307.

After formation of the proximal constraint 382 and the middle constraint 392, the constrained plurality of optical waveguides 315 may be pulled again to a further length (not shown) for separating the constrained plurality of optical waveguides 315 to form a pair of separate optical waveguide bundles including first and second optical waveguide bundles.

According to one embodiment, the constrained plurality of optical waveguides 315 may be separated at approximately the middle portion 317 by cutting approximately through the middle of the middle constraint 392. In addition, another cut (not shown) may be made through approximately the middle of the proximal constraint 382 located at the proximal portion 307 to form the first optical waveguide bundle and the second optical waveguide bundle. The constrained plurality of optical waveguides 315 may be cut, for example, by a cutting device 391 or by any other suitable device for cutting optical waveguides.

After splitting approximately the middle of the proximal constraint 382, approximately a first half of the proximal constraint 382 forms a subsequent distal constraint for forming a subsequent pair of optical waveguide bundles. For example, the constraint 380 shown in FIG. 3A becomes the distal constraint after the first two bundles are created and the process shown in FIGS. 3B–C is repeated for forming subsequent bundles. The subsequent distal constraint operates similar to the initial distal constraint 380 formed during the initialization of the process as described above with reference to FIG. 3A. The entire process described above, with reference to FIGS. 3B through 3C, may be repeated any number of times, for example, as a continuous process or a repetitive process, to form subsequent pairs of optical waveguide bundles. A steady state may be achieved wherein the formation of subsequent pairs of optical waveguide bundles occurs in a substantially steady and continuous manner. Because the subsequent distal constraint for the subsequent pair of optical waveguide bundles is formed from approximately the first half of the cut proximal constraint 382, a subsequent initialization process is not required. However, a subsequent initialization process may be performed if desired.

Each of the first and second optical waveguide bundles are examples of, and may have the characteristics of, the optical waveguide bundle 100 shown in FIG. 1. In addition, a diameter of each of the plurality of optical waveguides 315 may correspond to approximately at least one pixel dimension.

In one example, the constrained distal portion 327 of the plurality of optical waveguides 315 may also be cut by the cutting device 391 to form the second optical waveguide bundle, such that the second optical waveguide bundle includes a second constrained bundle of optical waveguides 315 extending from the cut distal portion 327 to approximately a second half of the cut middle portion 317. Thus, the second optical waveguide bundle may include the plurality of optical waveguides 315 corresponding to the second bundle length L2 of the constrained optical waveguides 315. By cutting the optical waveguides 315 at the portions described above, pairs of optical waveguide bundles may be formed substantially simultaneously.

The optical waveguide bundles, such as the optical waveguide bundles 200A, 200B and 200C shown in FIG. 2A, may also be formed, for example, by employing a bevel cut or another suitable type of cutting operation, as shown and described in U.S. patent application Ser. No. 10/698,829 to Kuo et al., entitled "Light guide apparatus for use in rear projection display environments," previously incorporated by reference. A bevel cut may be employed to form an enlarged view of a received input image. The angle of beveling may be variable, for example, the angle of beveling may be approximately less than ten degrees.

Magnification in a direction orthogonal to the bevel may be accomplished by adjusting the spacing between adjacent optical waveguides. Other features and techniques pertaining to magnification, as shown and described in U.S. patent application Ser. No. 10/698,829 to Kuo et al., entitled "Light guide apparatus for use in rear projection display environments," previously incorporated by reference, may also be employed with the optical waveguides.

As described in detail above, with reference to FIG. 2A, the constrained first optical waveguide bundle and the constrained second optical waveguide bundle may be stacked, aligned and otherwise configured to form a display device. The waveguide bundles formed in the manner described with respect to FIGS. 3A–3C may be stacked, aligned and otherwise configured to form a display device, such as the display device shown in FIG. 2B. On one embodiment, a waveguide in each bundle may display a pixel on a screen, and thus possibly millions of waveguides may be arranged to form the display device.

In configuring the first optical waveguide bundle and the second optical waveguide bundle to form a display device, a first adhesive (not shown) may be applied to attach the cut distal portion 327 of the second optical waveguide bundle to the cut proximal portion 307 of the first optical waveguide bundle, wherein the attached cut distal portion 327 and the cut proximal portion 307 form a section of the constrained, output-side optical waveguide face plate 288 of the display device. In addition, a second adhesive (not shown) may also be applied to attach the cut middle portion 317 of the first optical waveguide bundle to the cut middle portion 317 of the second optical waveguide bundle, wherein the attached cut middle portion 317 of the first optical waveguide bundle and the cut middle portion 317 of the second optical waveguide bundle form a section of the constrained, input-side optical waveguide face plate 278 of the display device.

The constrained, output-side optical waveguide face plate 288 of the display device and the constrained, input-side optical waveguide face plate 278 of the display device may be arranged in a substantially orthogonal configuration. In addition, at least one agent, such as a chemical agent, may be applied to increase a thickness of the constrained light output side of the display device, corresponding to the constrained, output-side optical waveguide face plate 288 of the display device. At least one light scattering material may also be applied to the constrained, output-side optical waveguide face plate 288 of the display device.

Alternatively since the optical fiber bundles may remain flexible and unconnected between input and output side a variable angle between faceplates 278 and 288 may be obtained in operation to facilitate viewing or installation.

Figure 4:
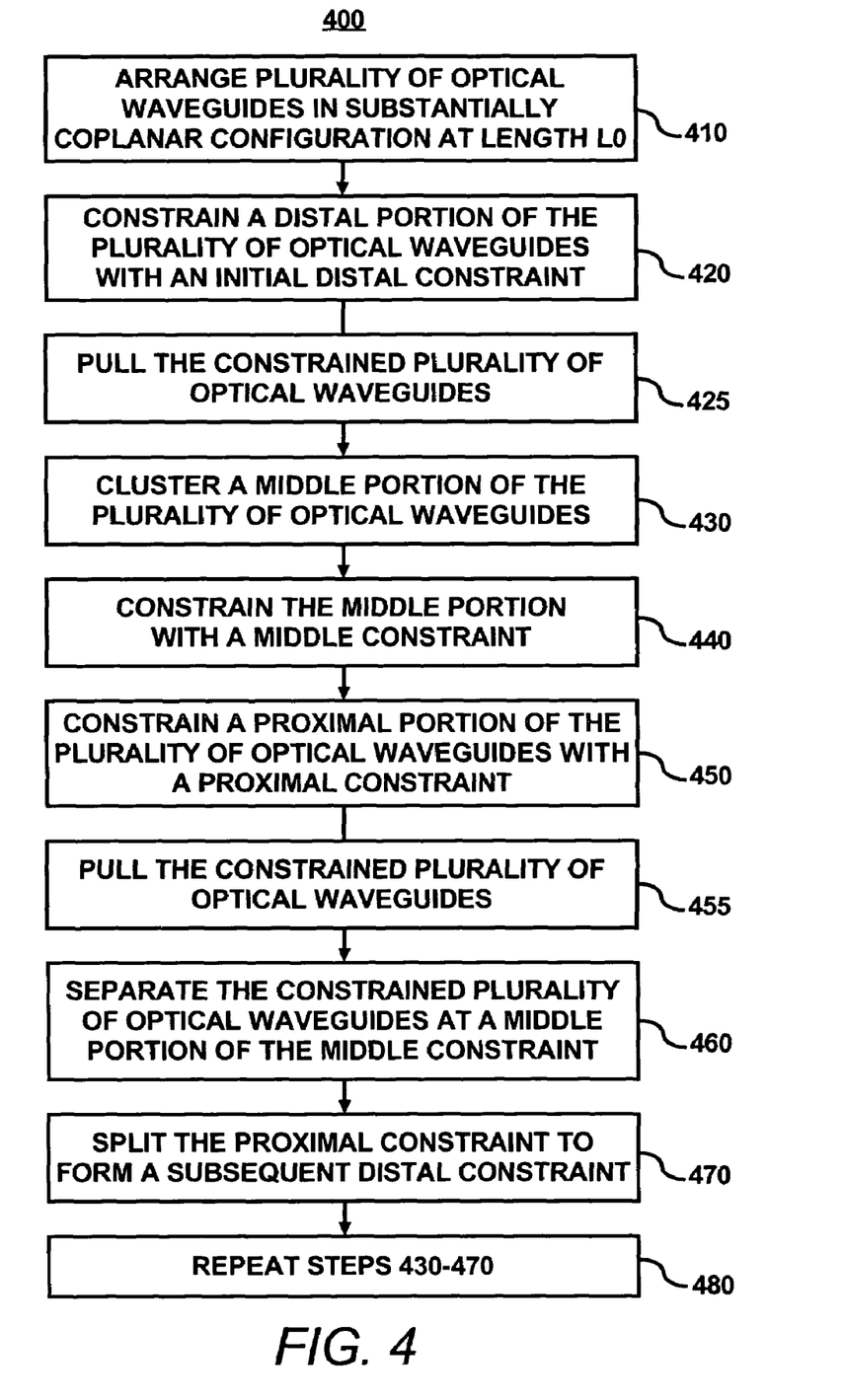
FIG. 4 shows a flowchart for a method of forming a plurality of optical waveguide bundles, according to an embodiment.

Referring to FIG. 4, a flowchart 400 is shown for a method of forming a plurality of optical waveguide bundles, according to an embodiment. The flowchart 400 is shown by way of example and not limitation. At step 410, the plurality of optical waveguides 315 are arranged in a substantially coplanar configuration at length L0, as shown in FIG. 3A At step 420, the distal portion 303 of the plurality of optical waveguides 315 is constrained with the initial distal constraint 380. At step 425, the constrained plurality of optical waveguides 315 is pulled to the subsequent length of approximately L1 plus L2, as shown in FIG. 3B. At step 430, the approximate middle portion 317 of the plurality of optical waveguides 315 is clustered, wherein the middle portion 317 retains the substantially coplanar configuration. At step 440, the middle portion 317 is constrained with the middle constraint 392. At step 450, the proximal portion 307 of the plurality of optical waveguides 315 is constrained with the proximal constraint 382. At step 455, the constrained plurality of optical waveguides 315 is pulled to a further length for separating the constrained plurality of optical waveguides 315 into the first and second optical waveguide bundles. At step 460, the constrained plurality of optical waveguides 315 is separated at approximately the middle portion 317 of the middle constraint 392. At step 470, the proximal constraint 382 is split to form both the proximal constraint for the first optical waveguide bundle and also the subsequent distal constraint for the next or subsequent pair of optical waveguide bundles. As indicated at step 480, the process may be repeated as a continuous or repetitive process starting again with step 430 and continuing through step 470 until, for example, after a certain number of repetitions, all the available fiber bundles have been formed or until all the available fibers have been used.

Figure 5:
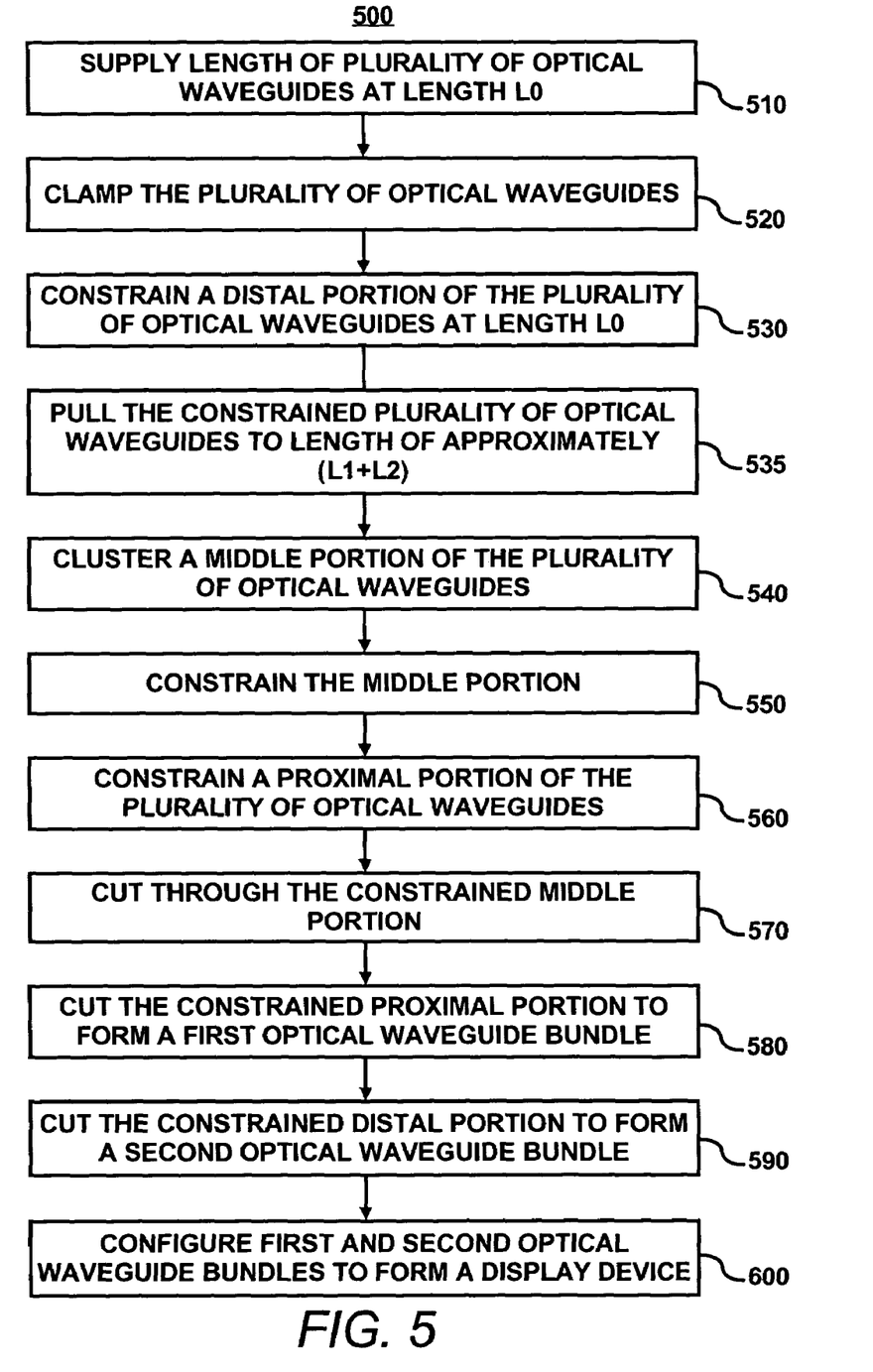
FIG. 5 shows a flowchart for a method of forming a display device, according to an embodiment.

Referring to FIG. 5, a flowchart 500 is shown for a method of forming a display device, according to an embodiment. The flowchart 500 is also shown by way of example and not limitation. At step 510, an initial supply of the plurality of optical waveguides 315 is supplied from the source 305 to a length L0. At step 520, the initial length L0 of the plurality of optical waveguides 315 is clamped with a first set of clamps 320 and 322, wherein the plurality of optical waveguides 315 retains a substantially coplanar configuration. At step 530, the distal portion 303 of the length L0 of the plurality of optical waveguides 315 is constrained with the initial distal constraint 380. At step 535, the constrained plurality of optical waveguides 315 is pulled to the subsequent length of approximately L1 plus L2. At step 540, the approximate middle portion 317 of the plurality of optical waveguides 315 is clustered, wherein the approximate middle portion 317 retains the substantially coplanar configuration. At step 550, the middle portion 317 is constrained with the middle constraint 392. At step 560, the proximal portion 307 of the plurality of optical waveguide 315 is constrained with the proximal constraint 382. At step 570, a cutting operation is performed through approximately a midline of the constrained middle portion 317. At step 580, another cutting operation is performed to split approximately in half the proximal constraint 382 to form the first optical waveguide bundle. Although a subsequent initialization process is not required during a continuous process of forming subsequent pairs of optical waveguide bundles, as described in detail above, step 590 may be performed if a subsequent initialization step is desired. At step 590, if a subsequent initialization step is performed, a cutting operation may be performed to cut through a subsequent initial distal constraint.

The entire process may be repeated again, starting with step 530, until, for example, all the optical waveguide bundles are created. At step 600, the first optical waveguide bundle and the second optical waveguide bundle and all the other subsequent formed optical waveguide bundles that are necessary to form a display device are configured to form the display device.

What has been described and illustrated herein are embodiments along with some variations. While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method of forming a plurality of optical waveguide bundles, the method comprising:
   (a) arranging a plurality of optical waveguides in a substantially coplanar configuration;
   (b) constraining a distal portion of the plurality of optical waveguides with an initial distal constraint;
   (c) pulling the constrained plurality of optical waveguides to a subsequent length, wherein the subsequent length comprises a first bundle length and a second bundle length;
   (d) clustering a middle portion of the plurality of optical waveguides, wherein the middle portion retains the substantially coplanar configuration;
   (e) constraining the middle portion with a middle constraint;
   (f) constraining a proximal portion of the plurality of optical waveguides with a proximal constraint;
   (g) pulling the constrained plurality of optical waveguides again a further length;
   (h) separating the constrained plurality of optical waveguides pulled to the further length at approximately the middle portion of the middle constraint; and
   (i) splitting the proximal constraint to form a first optical waveguide bundle and a second optical waveguide bundle, wherein approximately a first half of the proximal constraint forms a subsequent distal constraint for a subsequent plurality of optical waveguides.

2. The method of claim 1, further comprising:
repeating steps (d) through (i) to form the subsequent plurality of optical waveguide bundles.

3. The method of claim 1, wherein the first optical waveguide bundle is constrained by approximately a second half of the proximal constraint and an approximate first half of the middle constraint, further wherein the second optical waveguide bundle is constrained by the initial distal constraint and an approximate second half of the middle constraint.

4. The method of claim 1, wherein arranging the plurality of optical waveguides in the substantially coplanar configuration further comprises:
supplying an initial length of the plurality of optical waveguides;
arranging the initial length of the plurality of optical waveguides in a substantially coplanar configuration; and
constraining the initial length of the plurality of optical waveguides with the initial distal constraint.

5. The method of claim 4, further comprising:
clamping the initial length of the plurality of optical waveguides with a first set of clamps, wherein the plurality of optical waveguides retains the substantially coplanar configuration.

6. The method of claim 4, wherein supplying the initial length of the plurality of optical waveguides further comprises:
supplying the initial length of the plurality of optical waveguides through at least one guide mechanism.

7. The method of claim 6, wherein supplying the initial length further comprises:
supplying the initial length through a plurality of output periodicity defining pins.

8. The method of claim 1, wherein arranging the plurality of optical waveguides in the substantially coplanar configuration further comprises:
arranging the plurality of optical waveguides with an intervening space between each of the plurality of optical waveguides.

9. The method of claim 1, wherein constraining the distal portion of the plurality of optical waveguides with the initial distal constraint further comprises:
applying a curable epoxy to the distal portion; and
substantially fixing a position of the initial distal constraint.

10. The method of claim 1, wherein clustering the middle portion of the plurality of optical waveguides further comprises:
clamping the middle portion of the plurality of optical waveguides with a second set of clamps, wherein the middle portion is located at approximately a midpoint location between the first bundle length and the second bundle length, further wherein the middle portion is substantially free to move within the substantially coplanar configuration; and
clustering the middle portion of the plurality of optical waveguides, wherein the middle portion retains the substantially coplanar configuration.

11. The method of claim 10, wherein clustering the middle portion of the plurality of optical waveguides further comprises:
clustering the pulled plurality of optical waveguides using at least one of a pin and a clustering device.

12. The method of claim 10, further comprising:
immobilizing the middle portion of the plurality of optical waveguides with the second set of clamps; and
immobilizing the proximal portion of the plurality of optical waveguides with a third set of clamps.

13. The method of claim 12, further comprising:
constraining the immobilized middle portion of the plurality of optical waveguides; and
constraining the immobilized proximal portion of the plurality of optical waveguides.

14. The method of claim 13, wherein constraining the immobilized middle portion further comprises:
applying a curable epoxy to the immobilized middle portion.

15. The method of claim 13, wherein constraining the immobilized proximal portion further comprises:
applying a curable epoxy to the immobilized proximal portion.

16. The method of claim 1, further comprising:
stacking the first optical waveguide bundle and the second optical waveguide bundle;
aligning the first optical waveguide bundle and the second optical waveguide bundle; and
configuring the first optical waveguide bundle and the second optical waveguide bundle to form a portion of a display device.

17. The method of claim 16, wherein configuring the first optical waveguide bundle and the second optical waveguide bundle to form a portion of a display device further comprises:
applying a first adhesive to attach a first output side of the first optical waveguide bundle to a second output side of the second optical waveguide bundle, wherein the attached first output side and second output side form a constrained light output side of the display device; and
applying a second adhesive to attach a first input side of the first optical waveguide bundle to a second input side of the second optical waveguide bundle, wherein the attached first input side and second input side form a constrained light input side of the display device.

18. A method, comprising:
supplying an initial length of a plurality of optical waveguides;
clamping the initial length of the plurality of optical waveguides with a first set of clamps, wherein the plurality of optical waveguides retains a substantially coplanar configuration;
constraining a distal portion of the initial length of the plurality of optical waveguides;
pulling the plurality of optical waveguides to a fiber bundle pair length, wherein the fiber bundle pair length comprises a first bundle length and a second bundle length, wherein the first bundle length is approximately equal to the second bundle length;
clamping a middle portion of the plurality of optical waveguides with a second set of clamps;
clustering the middle portion of the plurality of optical waveguides while the plurality of optical waveguides are clamped by the second set of clamps and are free to move in the substantially coplanar configuration, wherein the middle portion retains the substantially coplanar configuration;
constraining the middle portion;
constraining a proximal portion of the plurality of optical waveguides with a constraint;
cutting through approximately a midline of the constrained middle portion;
cutting the constraint constraining the proximal portion to form a first optical waveguide bundle, wherein approximately a first half of the cut proximal portion forms a subsequent distal constraint for a subsequent plurality of optical waveguides, further wherein the first optical waveguide bundle comprises a first constrained bundle of optical waveguides extending from approximately a second half of the cut proximal portion to approximately a first half of the cut middle portion, further wherein the second optical waveguide bundle comprises a second constrained bundle of optical waveguides extending from the distal portion to approximately a second half of the cut middle portion.

19. The method of claim 18, further comprising:

applying a first adhesive to attach the distal portion of the second optical waveguide bundle to the cut proximal portion of the first optical waveguide bundle, wherein the attached distal portion and the cut proximal portion form a constrained light output side of a display device; and applying a second adhesive to attach the cut middle portion of the first optical waveguide bundle to the cut middle portion of the second optical waveguide bundle, wherein the attached cut middle portion of the first optical waveguide bundle and the cut middle portion of the second optical waveguide bundle form a constrained light input side of the display device.

20. The method of claim 19, further comprising:

arranging the constrained light output side of the display device and the constrained light input side of the display device in a substantially orthogonal configuration.

21. The method of claim 19, further comprising:

applying at least one agent to increase a thickness of the constrained light output side of the display device.

22. The method of claim 19, further comprising:

configuring the first optical waveguide bundle and the second optical waveguide bundle to form the display device.

23. The method of claim 18, wherein supplying the initial length of the plurality of optical waveguides further comprises:

supplying each of the plurality of optical waveguides, wherein a diameter of each of the plurality of optical waveguides corresponds approximately to at least one pixel dimension.

24. A method of forming a plurality of optical waveguide bundles, the method comprising:

(a) arranging a plurality of optical waveguides in a substantially coplanar configuration;

(b) constraining a distal portion of the plurality of optical waveguides with an initial distal constraint;

(c) pulling the plurality of fiber guides to predetermined length;

(d) clustering a middle portion of the plurality of optical waveguides, wherein the middle portion retains the substantially coplanar configuration;

(e) constraining the middle portion with a middle constraint;

(f) constraining a proximal portion of the plurality of optical waveguides with a proximal constraint;

(g) separating the constrained plurality of optical waveguides at approximately the middle portion of the middle constraint;

(h) cutting the proximal constraint to form a first optical waveguide bundle and a second optical waveguide bundle, wherein approximately a first half of the proximal constraint forms a subsequent distal constraint for a subsequent plurality of optical waveguides; and (i) repeating steps (c) through (h) to form the subsequent plurality of optical waveguides.

25. The method of claim 24, wherein constraining a proximal portion of the plurality of optical waveguides with a proximal constraint further comprises clamping the proximal portion with a first set of clamps; applying the proximal constraint to the proximal portion; and splitting the proximal constraint comprises cutting the proximal constraint.

26. The method of claim 25, wherein clustering a middle portion further comprises:

clamping the middle portion of the plurality of optical waveguides with a second set of clamps; and clustering the middle portion of the plurality of optical waveguides while the plurality of optical waveguides are clamped by the second set of clamps and are free to move in the substantially coplanar configuration.

* * * * *